No. 696,834.  
J. A. MITCHELL.  
MILK MODIFYING GAGE.  
(Application filed Sept. 23, 1901.)  
Patented Apr. 1, 1902.
(No Model.)
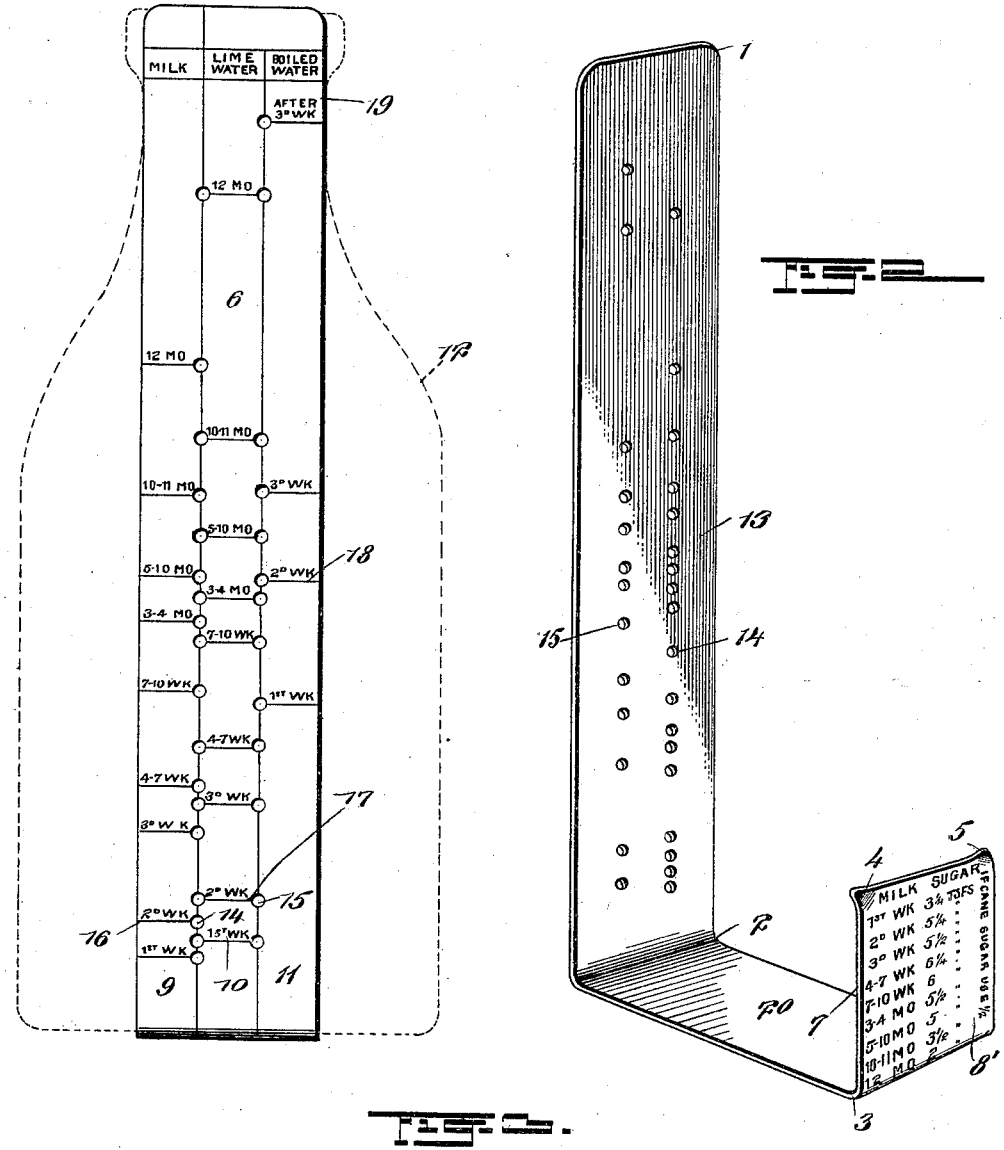

UNITED STATES PATENT OFFICE.

JAMES A. MITCHELL, OF NEW YORK, N. Y.

MILK-MODIFYING GAGE.

SPECIFICATION forming part of Letters Patent No. 696,834, dated April 1, 1902.

Application filed September 23, 1901. Serial No. 76,171. (No model.)

*To all whom it may concern:*

Be it known that I, JAMES A. MITCHELL, a citizen of the United States, and a resident of the city of New York, borough of Manhattan, in the county and State of New York, have invented a new and Improved Milk-Modifying Gage, of which the following is a full, clear, and exact description.

My invention relates to a milk-modifying gage—that is, to a device for measuring various quantities of milk, lime-water, and boiled water to be admixed together and used as infants' food.

In the accompanying drawings like numerals indicate like parts in all the views.

Figure 1 shows my device as applied to an ordinary milk-bottle of the capacity of a quart. Fig. 2 shows in perspective the gage when removed from the bottle, and Fig. 3 is an inverted plan showing the base of the gage.

A thin longitudinal strip 1 of any suitable material is bent at 2 to an acute angle approximating a right angle and is again bent at 3 to a similar angle, so that when the bottle 12 is placed in the gage, as shown in Fig. 1, the upright members 7 13 thereof will form right angles with the base 20, and when said bottle is removed the ends will spring slightly inward. The gage is therefore substantially L-shaped and provided with a toe. The corners 4 and 5 are bent inward, as shown in Fig. 2, for the purpose of acting as claws, and thereby affording a firm grip upon the bottle. The outer face 6 of the gage is of a length approximating the length of the bottle and is provided with graduations 9, 10, and 11, indicating, respectively, the amount of milk, lime-water, and boiled water suitable for different ages of the infant. Adjacent to these graduations and between the same are located two longitudinal rows of peep-holes 14 15, through which the observer may see the contents of the bottle and locate the exact depth of the fluids contained therein. Upon the bottom face or base 20 of the gage is a table 8, showing the percentage composition of fat, milk, sugar, and proteids for the different ages of the infant, ranging from one week to twelve months. Upon the outer face or toe of the gage is a sugar-table 8', indicating the number of teaspoonfuls of sugar suitable for different ages, also ranging from one week to twelve months.

Directions for using the milk-modifying gage: Place the bottle of milk, which has stood undisturbed for a sufficient time to allow the cream to rise, on the footpiece of the gage, so that the gage is held firmly to the bottle by the short arm 8', as above described. Remove, by means of a siphon, milk from the bottom of the bottle until the upper level of the cream reaches the desired level as indicated on the milk-column 9 of the long arm of the gage. Add lime-water until the upper level of the mixture reaches the desired level as indicated on the lime-water column 10 of the long arm of the gage. Add sugar of milk, the amount in teaspoonfuls, as indicated on the short arm 8' of the gage. As the sugar dissolves the liquid measurements are not disturbed by the addition of the sugar. Add boiled water until the upper level of the mixture reaches the desired level as indicated on the boiled-water column 11 of the long arm of the gage.

Example: Child two weeks old. Remove milk from the bottom of the bottle until the upper level of the cream remaining in the bottle reaches the horizontal line 16 on the milk-column labeled "2nd week." Add lime-water until the mixture reaches the horizontal line 17 on the lime-water column labeled "2nd week." Add five and one-fourth teaspoonfuls of sugar of milk. (If cane-sugar is used, use two and five-eighths teaspoonfuls.) Add boiled water until the upper level of the mixture reaches the horizontal line 18 on the boiled-water column labeled "2nd week." Replace cover on bottle and shake thoroughly. The milk so modified will give the percentage composition indicated upon the footpiece for the second week.

In case, however, the infant is three or more weeks old the quantity of boiled water to be added is just enough to fill the bottle to the point marked "After third week," or practically fill the bottle.

Where the milk is already bottled, a siphon is used to draw off the superfluous milk, so as to leave the proper quantity in the bottle, and the lime-water and boiled water are added, as above described.

Having thus described my invention, I claim as new and desire to secure by Letters Patent—

1. As an article of manufacture, a milk-modifying gage comprising a strip of sheet material bent twice at right angles, the bent portions being spaced asunder a distance commensurate with the size of a milk-bottle, for the purpose of embracing the exterior of said bottle, and provided with graduated scales parallel with the general direction of said bottle.

2. As an article of manufacture, a milk-modifying gage, comprising a strip of sheet material bent twice at right angles so as to partially embrace a bottle by engaging one of its sides and provided with sharp corners curved slightly inward for the purpose of clamping the bottom and two external sides thereof, a plurality of graduated scales arranged parallel with each other, and a plurality of peep-holes adjacent to said scales.

3. As an article of manufacture, a milk-modifying gage, comprising a strip of thin material bent twice at right angles so as to embrace a bottle by engaging the bottom and two external sides thereof and provided with sharp corners curved slightly inward, and also provided with a plurality of peep-holes arranged in parallel longitudinal rows and with graduations for measuring various depths of milk, lime-water and boiled water in said bottle.

4. As an article of manufacture, a milk-modifying gage, comprising a longitudinal member of thin spring metal bent twice at right angles and provided with curved corners for clamping a bottle, and also provided with three exterior faces, one of said faces having a plurality of parallel graduated scales and parallel rows of peep-holes adjacent to said scales, and the other two of said faces being provided with numerical tables.

In testimony whereof I have signed my name to this specification in the presence of two witnesses.

JAMES A. MITCHELL.

Witnesses:
WALTER HARRISON,
EVERARD B. MARSHALL.